Nov. 24, 1925.

A. C. HOPKINS 1,563,028

CARRIER FOR BRAIDING MACHINES

Filed April 18, 1924    3 Sheets-Sheet 1

Inventor:
Arthur C. Hopkins

Nov. 24, 1925.
A. C. HOPKINS
1,563,028
CARRIER FOR BRAIDING MACHINES
Filed April 18, 1924     3 Sheets-Sheet 2
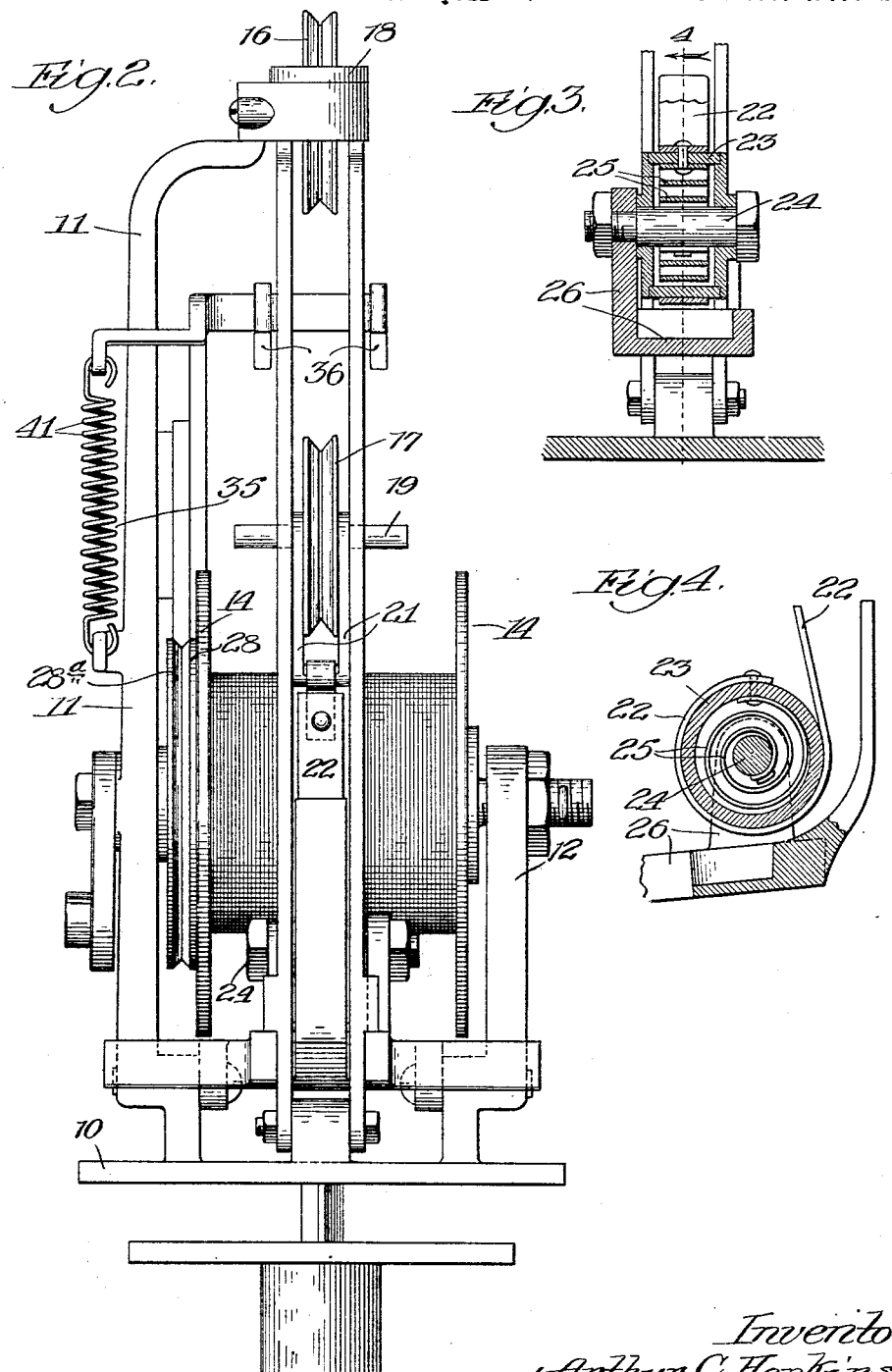

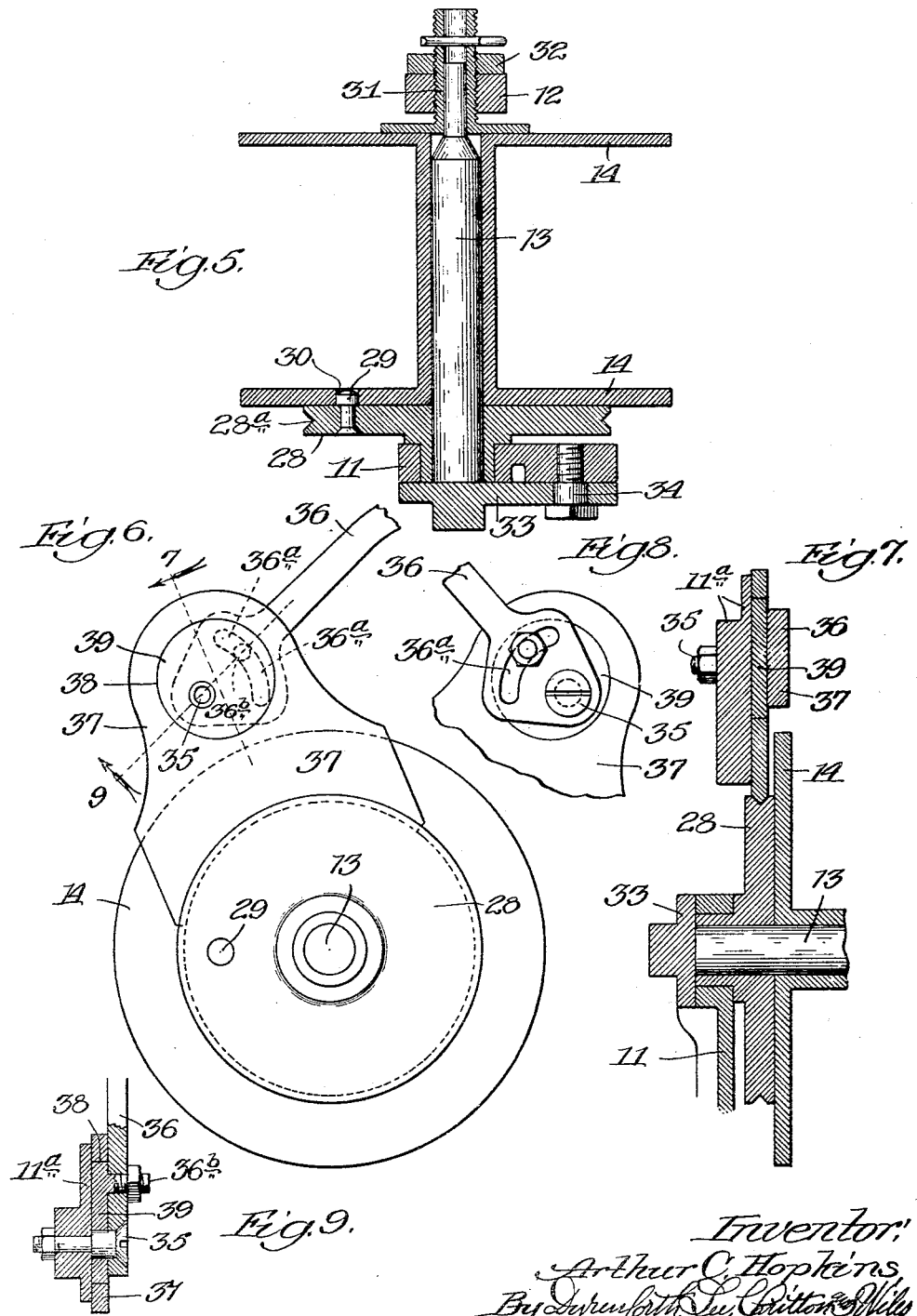

Patented Nov. 24, 1925.

1,563,028

UNITED STATES PATENT OFFICE.

ARTHUR C. HOPKINS, OF NILES, MICHIGAN, ASSIGNOR TO NATIONAL STANDARD COMPANY, OF NILES, MICHIGAN, A CORPORATION OF MICHIGAN.

CARRIER FOR BRAIDING MACHINES.

Application filed April 18, 1924. Serial No. 707,394.

*To all whom it may concern:*

Be it known that I, ARTHUR C. HOPKINS, a citizen of the United States, residing at Niles, in the county of Berrien and State of Michigan, have invented a new and useful Improvement in Carriers for Braiding Machines, of which the following is a specification.

This invention relates to carriers for use with braiding machines and is particularly adapted for machines which braid wire and the like. The invention is fully described in the following specification and shown in the drawings is which:

Fig. 2 is a rear elevation of the same;

Fig. 3 is a partial vertical section on the line 3 of Fig. 1;

Fig. 4 is a section on the line 4 of Fig. 3;

Fig. 5 is a horizontal section on the line 5 of Fig. 1;

Fig. 6 is a side elevation of the drum and braking device;

Fig. 7 is a section on the line 7 of Fig. 6;

Fig. 8 is a partial reversed view of the same; and

Fig. 9 is a section on the line 9 of Fig. 6.

Figure 1:
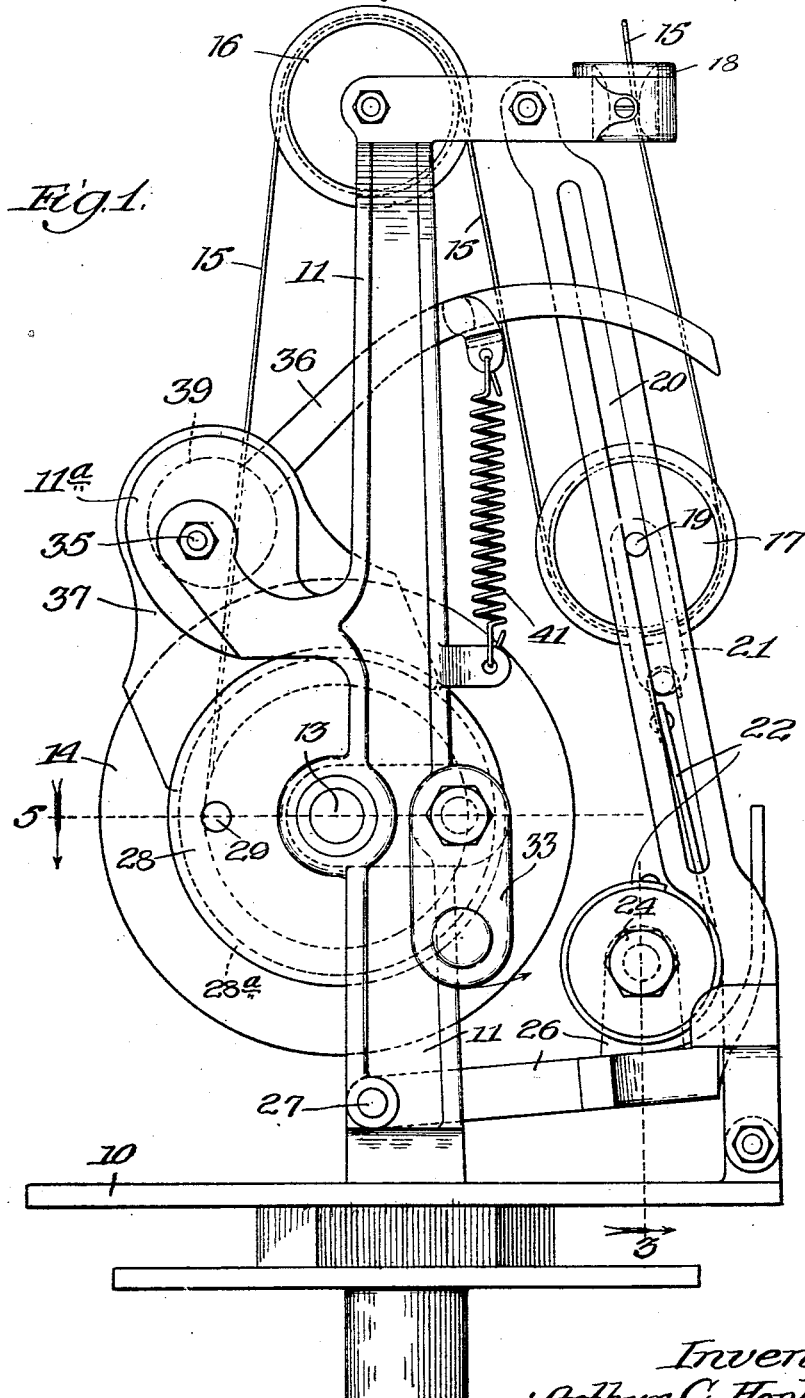
Figure 1 is a side elevation of the carrier embodying the invention.

The embodiment as illustrated comprises a braiding carrier having a base 10 which is adapted to be taken by a braiding machine of a well known type. From the base 10 rises two standards 11 and 12 which have registering holes adapted to receive the round pin 13 upon which a reel 14 is adapted to be journalled.

This reel carries wire 15 which passes up over the sheave 16 which is journalled at the top of the standard, then down under the sheave 17 and out through the eyelet 18.

The sheave 17 is journalled upon a pin 19 which passes through guideways 20, the pin 19 being drawn down by means of a yoke 21 which is attached to a flexible member 22 of leather or the like which is wound about the drum 23. This drum is journalled on a pin 24 and is normally retracted by means of a spiral spring 25. The pin 24 is secured to a member 26 which is hingedly mounted at 27 to the standards 11 and 12. As long as the tension is maintained on the wire 15, it will act through the sheave 17 and the flexible member 22 to hold the trip member 26 in raised position as shown in Fig. 1. Braking of the wire 15 will permit the trip member 26 to drop thereby operating the trip mechanism (not shown) in a manner well known in machines of this character.

Referring now to Fig. 5, the brake sheave 28 is journalled on the pin 13 and within the standard 11 and has a pin 29 which is adapted to engage a hole 30 in the side of the reel 14.

The opposite side of the pin 13 is reduced and is journalled in a sleeve 31 which is threaded into the standard 12 and has a locknut 32 for securing it in adjusted position. This adjustment is needed both to take care of the inequality in the length of the reels 14 and to facilitate the insertion and removal of these reels.

To remove the reel 14, the nut 32 is released and the sleeve 31 is screwed outwardly thereby loosening the reel 14. The keeper 33 is then swung about the shouldered screw 34 to the position shown in Fig. 1, when the pin 13 can be readily withdrawn. The reel 14 can then be swung about the pin 30 as a center substantially 180° from the position shown in Fig. 5, the pin 29 being in the position shown in Fig. 1, when the reel 14 will readily pass out of the carrier.

An arm 11ª of the standard 11 carries a shouldered screw 35 as shown in Fig. 9 upon which is hingedly mounted the arm 36, the outer end of which is bifurcated and is adapted to engage the two ends of the pin 19.

A fibre brake shoe 37 has an opening 38 fitting over the circular eccentric 39 which is secured to the lever arm 36 by means of the screw 40. The lever arm 36 and the eccentric 39 move together so that as the arm 36 is raised and lowered, the fibre shoe 37 will be moved from and toward the brake drum or sheave 28. The engaging edge of the brake shoe 37 is made arcuate to fit the brake drum 28 and is also made V-shaped to fit the V-shaped groove 28ª in the brake drum. An arcuate slot 36ª is formed in the arm 36 for the bolt 36ᵇ so as to permit adjustment of the normal braking position of this arm, and a spring 41 normally holds the brake shoe 37 in contact with the brake drum.

As this braiding carrier passes around the braiding table (not shown), the sheave 17 will be drawn in and out by the spring 25 to accommodate the give and take on the wire 15 which is incident to the braiding operation. As the wire 15 is taken up in the braiding operation the pin 19 will eventually strike the arm 36 on its upward swing thereby raising the brake shoe 37 when the pull on the wire 15 will cause the reel 14 to turn, thereby paying out more wire and permitting the spring 25 to draw the sheave 17 down a short distance. When this occurs the arm 36 is again released, the spring 41 drawing it back, and setting the brake shoe 37 on the drum 28.

The braking mechanism herein shown together with the long spiral spring 25 permits a uniformity of tension not heretofore known in devices of this character. The result is that braid made with machines using this carrier will run more uniform and will lay perfectly flat, whereas braid of this kind has heretofore often had a tendency to warp and twist badly.

While I have shown and described certain embodiments of my invention, it is to be understood that it is capable of many modifications. Changes therefore in the construction and arrangement may be made without departing from the spirit and scope of the invention as disclosed in the appended claims, in which it is my intention to claim all novelty inherent in my invention as broadly as possible in view of the prior art.

I claim:

1. In a braider, a carrier comprising a base, standards rising from the base, a brake drum journalled in one of said standards, a brake shoe movable into and out of contact with said drum, a lever arm operably connected to said brake shoe, a spring normally holding said shoe against said drum, a reel operably connected to said drum, and tensioned means over which the wire from said reel passes for engaging said lever to release the brake shoe as the wire is fed.

2. In a braider, a carrier comprising a base, standards rising from the base, a brake drum journalled in one of said standards and having a V-shaped groove in its periphery, an arcuate hard fibre brake shoe movable into and out of contact with said drum, a lever arm operably connected to said brake shoe, a spring normally holding said shoe against said drum, a reel operably connected to said drum, and tensioned means over which the wire from said reel passes for engaging said lever to release the brake shoe as the wire is fed.

3. In a braider, a carrier comprising a base, standards rising from the base, a brake drum journalled in one of said standards, a brake shoe movable into and out of contact with said drum, a lever arm operably connected to said brake shoe, a spring normally holding said shoe against said drum a reel operably connected to said drum, tensioned means over which the wire from said reel passes for engaging said lever to release the brake as the wire is fed, a threaded sleeve screwed into the standard opposite said brake drum, and means for locking said sleeve in adjusted position.

4. In a braider, a carrier comprising a base, standards rising from the base, a brake drum journalled in one of said standards, a brake shoe movable into and out of contact with said drum, a lever arm operably connected to said brake shoe, a spring normally holding said shoe against said drum, a reel operably connected to said drum, and tensioned means over which the wire from said reel passes for engaging said lever to release the brake shoe as the wire is fed, said last mentioned means comprising a trip member pivotally connected to said standards.

ARTHUR C. HOPKINS.